(12) United States Patent
Takahashi

(10) Patent No.: US 8,088,215 B2
(45) Date of Patent: Jan. 3, 2012

(54) DIFFUSION REACTION METHOD AND DIFFUSION REACTION DEVICE

(75) Inventor: Kazunori Takahashi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 297 days.

(21) Appl. No.: 12/372,404

(22) Filed: Feb. 17, 2009

(65) Prior Publication Data

US 2009/0223413 A1    Sep. 10, 2009

(30) Foreign Application Priority Data

Feb. 20, 2008  (JP) ................................. 2008-038902

(51) Int. Cl.
*C08K 5/00* (2006.01)
*B01J 19/00* (2006.01)
*B01F 13/00* (2006.01)

(52) U.S. Cl. ........ 106/493; 422/187; 422/224; 422/502; 422/603; 366/336; 366/341

(58) Field of Classification Search .................. 422/187, 422/224, 502, 603; 366/336, 341; 106/493
See application file for complete search history.

(56) References Cited

U.S. PATENT DOCUMENTS 6,921,433 B2    7/2005  Kuribayashi et al.
2007/0012221 A1*  1/2007  Maeta et al. .................. 106/498

FOREIGN PATENT DOCUMENTS

JP          2004-43776 A     2/2004
WO     WO 2007/072002   *  6/2007

* cited by examiner

*Primary Examiner* — Walter Griffin
*Assistant Examiner* — Lessanework Seifu
(74) *Attorney, Agent, or Firm* — Sughrue Mion, PLLC

(57) ABSTRACT

A diffusion reaction method includes: joining a plurality of reaction liquids relating to a reaction to form a multilayer flow; sandwiching from both sides of the multilayer flow in the depthwise direction using sandwiching liquid so that the multilayer flow is contracted and thinned; and flowing the multilayer flow through a reaction channel to cause a diffusive mixing between laminar flows so as to cause the reaction. The method enables to allow reacting diffusive mixing a plurality of reaction liquids instantly in a reaction channel, is suitable for any kinds of reaction product. Further, for example, when forming fine particles in a diffusion reaction, the method can prevent logging of the reaction channel by the fine particles and an adhesion of the fine particles to the wall of the reaction channel.

5 Claims, 8 Drawing Sheets

RELATED ART

RELATED ART

DIFFUSION REACTION METHOD AND DIFFUSION REACTION DEVICE

BACKGROUND OF THE INVENTION

1. Field of the Invention

The present invention relates to a diffusion reaction method and a diffusion reaction device (diffusion reactor) and more particularly, it relates to a technology for forming fine particles using a diffusion reaction.

2. Description of the Related Art

As a method for producing inorganic fine particles or organic fine particles, there is a build-up method in which the fine particles are precipitated by making a solution prepared by dissolving fine particle forming materials into a solvent and a poor solvent into which the fine particle forming materials are hardly dissolved to contact each other.

As one example of the fine particles produced by build-up method, there are organic pigment fine particles contained in ink for an ink-jet device. In late years, output expression of images diversifies with development of digitalization and a temporal stability of dye image is demanded. Responding to such a movement, a method for forming a transparent dye image with favorable weatherability and favorable heat-resistance is required, and organic pigments attract attention in viewpoints of weatherability and heat resistance. In particular, employing organic pigment fine particles with diameters of 100 nm or shorter, preferably 40 nm or shorter is requested in late years.

Examples of the method for producing organic pigment fine particles in accordance with the build-up method include Japanese Patent Application Laid-Open No. 2004-43776. Japanese Patent Application Laid-Open No. 2004-43776 discloses that an aggregate of organic pigment fine particles is formed by, after preparing water based disperse liquid using a microreactor, making the water based disperse liquid to contact with acid (flocculant) each other in a tank, thereby enabling to easily remove floats (salt and an unnecessary dispersing agent) in the disperse liquid by a filter filtration, and then the organic pigment fine particles without any floats are produced by dispersing the aggregate again.

SUMMARY OF THE INVENTION

However, the method disclosed in Japanese Patent Application Laid-Open No. 2004-43776 includes following problems in the fine particle formation process with the microreactor and the aggregate formation process in the tank, respectively.

(1) In the fine particle formation process, for forming the organic pigment fine particles with favorable monodisperse property in a nanometer size, it is necessary to diffusively mix a plurality of reaction liquids in a reaction channel of a microreactor instantly and cause reaction between the reaction liquids. To this end, it is necessary to decrease a size of an equivalent-diameter of the reaction channel, however, that causes problems of clogging of the reaction channel by the formed fine particles, of instability of liquid flow by the fine particles adhering to a wall of the reaction channel, and so on. Accordingly, depending on the kind of the reaction product, the width of the reaction channel cannot be narrowed, although the narrowing is required in order to instantly perform diffusive mixing.

(2) In the aggregate formation process, when an acid is added in a tank, it is necessary to add the acid being several times denser in concentration than an intended concentration to achieve a certain acid concentration in the tank. This causes great concentration difference in acid concentration between in a position where the acid is added into the tank and a position distant from that position. As a result, the aggregation reaction becomes inhomogeneous depending on the position in the tank, and hence re-dispersion of the aggregate cannot be normally performed thereafter. Therefore, the organic pigment fine particles in a nanometer (nm) size with a favorable monodisperse property cannot be obtained.

(3) In addition, apparatuses for performing two processes, that is, the microreactor for the fine particle formation process and the tank for the aggregate formation process are required, thereby increasing in cost.

These problems contained in Japanese Patent Application Laid-Open No. 2004-43776 are not limited to when the organic pigment fine particles are produced by the build-up method, but they may occur when other organic or inorganic fine particles are produced by the build-up method.

The present invention has been made in view of the above situation, and aims to provide a diffusion reaction method and a diffusion reaction device which can diffusively mix a plurality of reaction liquids so that the reaction liquids can instantly react in the reaction channel, and which can be used for any kinds of reaction products. In addition, the method and device are capable to perform the fine particle formation process and the aggregate formation process in one process while preventing clogging of the reaction channel by the fine particles and an adhesion of the fine particles to the wall of the reaction channel, and also solve the problem of concentration difference of flocculants.

To achieve the above object, a first aspect of the present invention provides a diffusion reaction method including: joining a plurality of reaction liquids relating to a reaction to form a multilayer flow; sandwiching from both sides of the multilayer flow in the depthwise direction using sandwiching liquid so that the multilayer flow is contracted and thinned; and flowing the multilayer flow through a reaction channel to cause a diffusive mixing between laminar flows so as to cause the reaction.

Here, the term "multilayer flow" corresponds to a flow made by laminating a plurality of reaction liquids in the state of a laminar flow, and it is formed at an inlet portion of the reaction channel. The multilayer flow diffusively mixes and reacts while flowing through the reaction channel.

In the method according to the first aspect of the invention, the multilayer flow is contracted and thinned to be a thin laminar flow not by narrowing the width of the reaction channel itself, as is conventionally done, but by sandwiching the multilayer flow from both sides in a depthwise direction of the multilayer flow using sandwiching liquid. This method realizes the flow contraction and thinning of the multilayer flow without elevating a pressure loss in the reaction channel. In this case, the sandwiching liquid can be any liquid which is different from the reaction liquid, or any one of the plurality of reaction liquids can be used as the sandwiching liquid. When the liquid which is different from the reaction liquids is used as the sandwiching liquid, a liquid which is not reactive with the reaction liquids or a liquid having non-compatibility with the reaction liquids is preferably used as the sandwiching liquid.

Thus, even though the width of the reaction channel itself is enlarged over the level of the width of the reaction channel of the conventional microreactor, a plurality of reaction liquids can be instantly diffusive mixed and react because the multilayer flow itself relating to the reaction is thinned to be a thin laminar flow by sandwiching using the sandwiching liquid.

Further, even though the reaction product is fine particles such as, for example, organic pigment fine particles, the width of the reaction channel itself can be enlarged. Therefore, disadvantages of the clogging by the fine particles formed or instability of the multilayer flow caused by the particles adhered onto a wall of the reaction channel can be prevented. In addition, because the flow rate of the liquid flowing through the reaction channel is fast at the central portion and is slow in the vicinity of the wall inside the reaction channel, the fine particles formed in the vicinity of the wall inside the reaction channel are apt to easily adhere onto the wall inside the reaction channel according to the conventional method. However, in the method according to the first aspect of the present invention, because the sandwiching liquid flows along the wall of the reaction channel in the depthwise direction of the multilayer flow, the adhesion of the fine particles can be effectively prevented.

Accordingly, the method can realize reaction of the plurality of reaction liquids by instantly diffusive-mixing them in the reaction channel, and at the same time, can be useful to any kinds of reaction product. In addition, even when, for example, the fine particles are formed by a diffusion reaction, clogging of the reaction channel by the fine particles and an adhesion of the fine particles to the wall of the reaction channel can be prevented. Accordingly, the fine particle formation process and the aggregate formation process can be carried out at once. Therefore, the problem of the flocculants concentration distribution occurred at the timing when flocculants is add into the conventional tank can be also overcome.

In addition, employing a heat medium as the sandwiching liquid and heating or cooling the heat medium enables to rapidly heat or cool the multilayer flow having been contracted and thinned to be a thin laminar flow.

According to a second aspect of the present invention, in the diffusion reaction method according to the first aspect of the invention, the multilayer flow is thinned to be 50 µm or less.

This enables to instantaneously diffusively mix the plurality of reaction liquids and to cause reaction between them. The multilayer flow is thinned to be preferably 50 µm or less, more preferably not larger than 10 µm, and in particular, further preferably not larger than 0.1 µm. It is impossible to achieve such a super thinning by conventional method in which the multilayer flow to flow is contracted by narrowing the reaction channel because of problems in a machining. However, sandwiching the multilayer flow with the sandwiching liquid like in the present invention easily enables to achieve the super thinning of the multilayer flow.

According to a third aspect of the present invention, the diffusion reaction method according to the first or the second aspect of the invention, further includes varying a degree of the thinning of the multilayer flow by changing a flow rate of the sandwiching liquid which sandwiches the multilayer flow.

In accordance with the third aspect of the present invention, since a degree of the thinning of the multilayer flow can be varied by changing a flow rate of the sandwiching liquid which sandwiches the multilayer flow, an appropriate thinning of the multilayer flow is realized depending on the kind of the reaction liquid for a diffusion reaction.

According to a fourth aspect of the present invention, in the diffusion reaction method according to any one of the first to the third aspects of the invention, the plurality of reaction liquids are a solution prepared by dissolving fine particle forming materials into a good solvent and a poor solvent with respect to the fine particle forming materials, and the diffusion reaction method further includes precipitating fine particles by causing diffusive mixing of the two reaction liquids in the reaction channel and by making them to react each other.

The fourth aspect of the present invention specifies that the reaction product formed by the diffusion reaction is the fine particle. The diffusion reaction according to the present invention has effects particularly in fine particles formation.

According to a fifth aspect of the present invention, the diffusion reaction method according to the fourth aspect of the invention, further includes aggregating the precipitated fine particles in the reaction channel by inclusion of a flocculant into the poor solvent.

The fifth aspect of the present invention proposes to carry out both the fine particle formation process and the aggregate formation process at once in the reaction channel. It can be achieved by applying the diffusion reaction method of the present invention.

According to a sixth aspect of the present invention, in the diffusion reaction method according to the fourth or the fifth aspect of the invention, the fine particles formed by the diffusion reaction are organic pigment fine particles.

The formation of organic pigment fine particles and the formation of aggregate are accompanied by a lot of conventionally unsolved problems as described above, and an application of the present invention overcomes the problems.

To achieve the above object, a seventh aspect of the present invention provides a diffusion reaction device comprising: a main body which forms a multilayer flow by joining a plurality of reaction liquids relating to a reaction each other, and causes a diffusive mixing between laminar flows to cause the reaction by flowing the multilayer flow through a reaction channel, wherein the main body comprises: a plurality of first introduction channels which are connected with an inlet portion of the reaction channel and which form the multilayer flow by introducing the plurality of reaction liquids to join each other at the inlet portion; and a pair of the second introduction channels which are connected with the inlet portion of the reaction channel from both sides the first introduction channels, and contract and thin the multilayer flow by introducing sandwiching liquid so as to sandwich the multilayer flow.

The seventh aspect composes the method according to the first aspect of the present invention as a device. That is, since the main body comprises the first introduction channels which form the multilayer flow by introducing the plurality of reaction liquids at the inlet portion of the reaction channel and the second introduction channels which feed the sandwiching liquid for sandwiching the multilayer flow from both sides of the multilayer flow in the depthwise direction, the plurality of reaction liquids can react by instantaneously diffusive-mixing in the reaction channel. At the same time, the device can be used for any kinds of reaction products. In addition, also in this case, the sandwiching liquid can be any liquid which is different from the reaction liquid, or any one of the plurality of reaction liquids can be used as the sandwiching liquid. When the liquid which is different from the reaction liquid is used as the sandwiching liquid, a liquid which is not reactive with the reaction liquids or a liquid having non-compatibility with the reaction liquids is preferably used as the sandwiching liquid.

Accordingly, even when, for example, the fine particles are formed by a diffusion reaction, clogging of the reaction channel by the fine particles and an adhesion of the fine particles to the wall of the reaction channel can be prevented. Therefore, the fine particle formation process and the aggregate formation process can be carried out at once, and a problem of concentration distribution of flocculant can be solved.

According to an eighth aspect of the present invention, the diffusion reaction device according to the seventh aspect of the invention further comprises: one outlet channel which is connected with an outlet portion of the reaction channel and discards a reaction product liquid produced in the reaction channel from the reaction channel; and a pair of recovery channels which are connected with the outlet portion of the reaction channel from both sides of the outlet channel and recover the sandwiching liquid introduced from the second introduction channel into the reaction channel.

The eighth aspect of the invention proposes a structure of the channel connecting to the outlet portion of the reaction channel. Because a pair of recovery channels for recovering the sandwiching liquid which is introduced into the reaction channel is disposed at the both sides of the outlet channel, the sandwiching liquid can be recovered and reused.

According to a ninth aspect of the present invention, in the diffusion reaction device according to the seventh or eighth aspect of the invention, the reaction channel has an equivalent-diameter being 0.5 mm or more, and an upper limit of a diameter of the reaction channel is a diameter which can form a laminar flow.

For the diffusion reaction, it is necessary for the reaction liquids to flow through the reaction channel in the state of the laminar flow. However, because diffusion can proceed instantly even when the reaction channel enlarges in the device according to the aspect, the equivalent-diameter of the reaction channel is specified as 0.5 mm or more in the viewpoint of pressure loss.

As thus described, even though the equivalent-diameter of the reaction channel settled is 0.5 mm or more, since the multilayer flow can be contracted and thinned by sandwiching with the sandwiching liquid as, the plurality of reaction liquids can be diffusive mixed each other to cause reaction between them without increasing pressure loss. In addition, even though the reaction products are fine particles, clogging of the reaction channel by the fine particles and an adhesion of the fine particles to the wall of the reaction channel can be prevented. Further, enlarging the equivalent-diameter of the reaction channel to 0.5 mm or more enables not only to decrease pressure loss but also to easily perform the machining of the reaction channel. The equivalent-diameter of the reaction channel is more preferably 1 mm or more, further more preferably 2 mm or more. The upper limit of the equivalent-diameter is the channel diameter which can form a laminar flow.

According to a tenth aspect of the present invention, the diffusion reaction device according to any one of the seventh to ninth aspects of the invention, further comprising a regulating device for regulating a flow rate of the sandwiching liquid which sandwich the multilayer flow in the second introduction channel.

In accordance with the tenth aspect of the present invention, because the regulating device for regulating the flow rate of the sandwiching liquid which sandwich the multilayer flow, a degree of contraction and thinning of the multilayer flow can be varied arbitrarily.

As described above, in accordance with the method and diffusion reaction device of the present invention, a plurality of reaction liquids can be instantaneously diffusive-mixed in a reaction channel to cause the reaction between them. In addition, and the method and diffusion reaction device can be used for any kinds of reaction product. Accordingly, even when the fine particles are formed by a diffusion reaction, clogging of the reaction channel by the fine particles and an adhesion of the fine particles to the wall of the reaction channel can be prevented. Therefore, the fine particle formation process and the aggregate formation process can be carried out at one process, and a problem of inhomogeneous concentration distribution of the flocculant can be solved.

DETAILED DESCRIPTION OF THE PREFERRED EMBODIMENTS

Preferred embodiments of a diffusion reaction method and a diffusion reaction device in accordance with embodiments of the present invention will now be described in detail with reference to the accompanying drawings.

Figure 1:
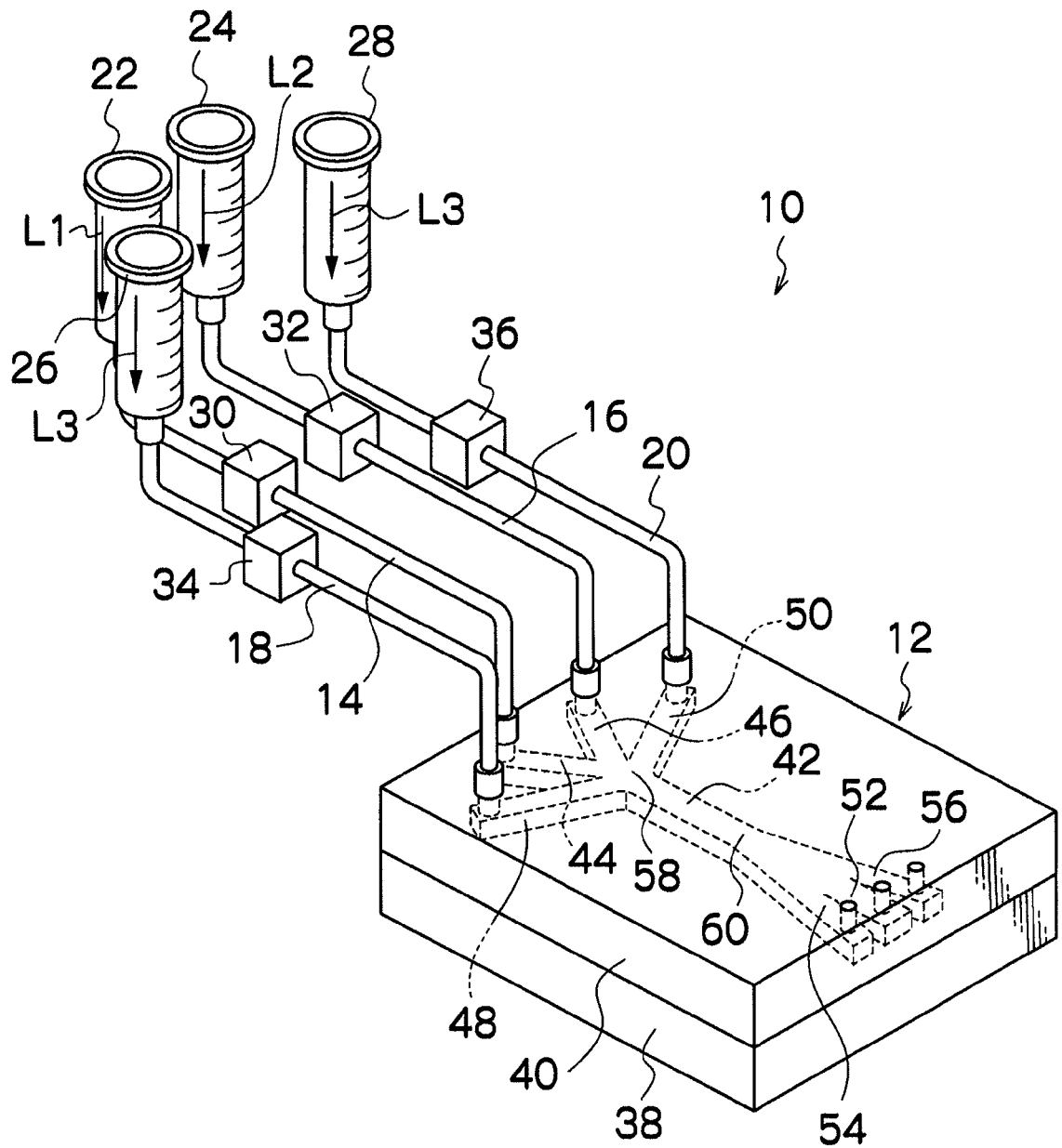
FIG. 1 is a perspective view for illustrating the general construction of a diffusion reaction device according to an embodiment of the present invention.
Figure 2:
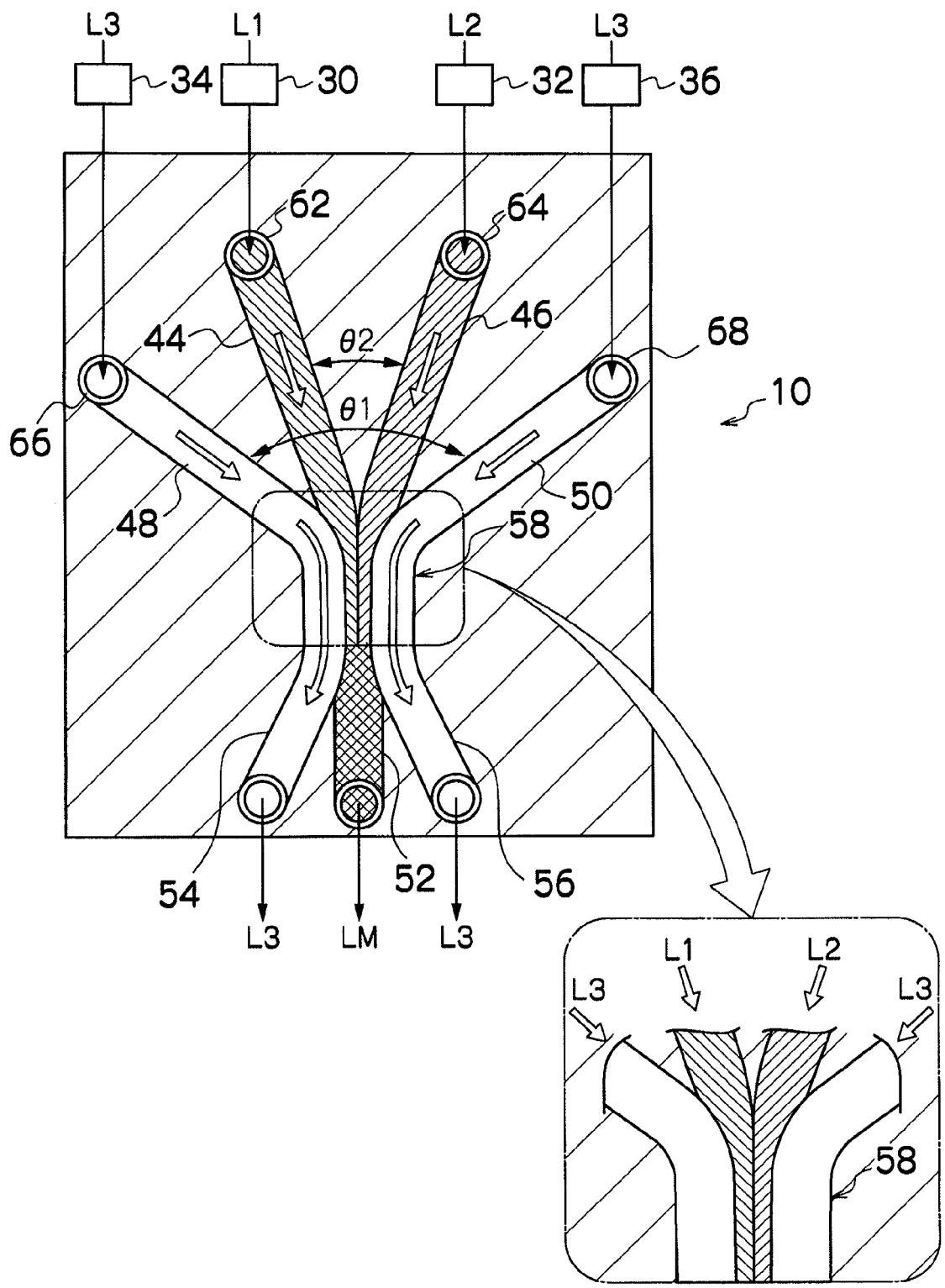
FIG. 2 is a conceptional plan view illustrating the diffusion reaction device according to the embodiment of the present invention.

FIG. 1 is a perspective view for illustrating a diffusion reaction device (diffusion reactor) 10 according to an embodiment of the present invention. FIG. 2 is a conceptional plan view illustrating each channel in a main body 12 of the diffusion reaction device 10. Additionally, in the embodiment, two kinds of reaction liquids L1 and L2 are used. In addition, in this description one kind of non-reaction liquid L3 being different from the reaction liquids L1 and L2, and being unreactive with the reaction liquids L1 and L2, is used as an exemplification of sandwiching liquid.

As shown in FIG. 1, the diffusion reaction device 10 according to the embodiment is mainly composed of a main body 12, two reaction liquid injection tubes 14 and 16 for injecting two kinds of reaction liquids L1 and L2 into the main body 12, two non-reaction liquid injection tubes 18 and 20 for injecting a non-reaction liquid L3 into the main body 12, supply devices 22, 24, 26 and 28 for respectively feeding reaction liquids L1, L2 and non-reaction liquid L3 into the main body 12 through the injection tubes 14 to 20, and flow rate regulators 30, 32, 34, and 36 attached to each injection tubes 14 to 20, respectively.

The main body 12 is formed by combining a substrate 38 and a cover plate 40 together, and on the combining surface of the substrate 38, a reaction groove, the first introduction groove, the second introduction groove, an outlet groove and a recovering groove are carved. Further, the cover plate 40 is fitted to integrate with the substrate 38 so as to form a reaction channel 42, a pair of the first introduction channels 44 and 46, a pair of the second introduction channels 48 and 50, single outlet channel 52, and a pair of recovery channels 54 and 56.

That is, a pair of the first introduction channels 44 and 46 for forming multilayer flow L1+L2 made by laminating the reaction liquids L1 and L2 are connected with an inlet portion 58 of the reaction channel 42 so that two kinds of the reaction liquid L1 and L2 are introduced to join together at the inlet portion (joining portion) 58 of the reaction channel 42. Further, at the outside (both sides) of the first introduction channels 44 and 46 on the same plane as the first introduction channels 44 and 46, a pair of the second introduction channels 48 and 50 for introducing the non-reaction liquid L3 into the inlet portion 58 are connected. Accordingly as shown in FIG. 2, an introducing angle θ1 of the non-reaction liquid L3 flowing through the pair of the second introduction channels 48 and 50 into the inlet portion 58 is larger than an introducing angle θ2 of the reaction liquids L1 and L2 flowing through the pair of the first introduction channels 44 and 46 into the inlet portion 58. As a result, because the non-reaction liquid L3 sandwiches the multilayer flow L1+L2 with a predetermined force from both sides in the depthwise direction of the layer at the inlet portion 58 of the reaction channel 42, the multilayer flow L1+L2 is contracted to have a taper shape and forms a thin laminar flow.

In addition, at an outlet portion 60 of the reaction channel 42, an outlet channel 52 for a reaction product liquid LM is connected, and recovery channels 54 and 56 for the non-reaction liquid L3 formed in a pair are connected at the outside (both sides) of the outlet channel 52. Thereby, outlet of the reaction channel 42 is branched into three channels 52, 54 and 56.

The pair of the first introduction channels 44 and 46 are connected with leading end portions of the two reaction liquid injection tubes 14 and 16 via through holes 62 and 64 formed on the cover plate 40 respectively, and supply devices 22 and 24 (for example, microsyringe pumps) for feeding the reaction liquid L1 and L2 into the main body 12 are connected to the base part of the respective reaction liquid injection tubes 14 and 16. In addition, the pair of the second introduction channels 48 and 50 are connected with leading ends of the two non-reaction liquid injection tubes 18 and 20 via through holes 66 and 68 formed on the cover plate 40 respectively, and supply device 26 and 28 (for example, microsyringe pumps) for feeding the non-reaction liquid L3 into the main body 12 are connected with a base end portion of the respective non-reaction liquid injection tubes 18 and 20.

It is preferable that a channel diameter of the reaction channel 42 is 0.5 mm or more as an equivalent-diameter, and that a channel diameter which can form a laminar flow in the reaction channel 42 is suitable as an upper limit. The equivalent-diameter of the reaction channel 42 is more preferably, 1 mm or more, further more preferably, 2 mm or more. In this case, the term "equivalent-diameter" is defined as a diameter when the cross sectional shape of the channel is assumed to be a circle.

The main body 12 having the above configuration can be fabricated in accordance with high precision processing technique such as micro drill machining technique, micro electrical discharge machining technique, molding using plating, injection molding, dry etching, wet etching, hot embossing and so on. Further, when the channel diameter of the reaction channel 42 is 0.5 mm or more as the equivalent-diameter, because it can be enlarged as compared with the reaction channel in general microreactor (microchannel), machining techniques using general purpose lathes and drilling machines are employable.

Materials for the main body are not specifically restricted and any materials to which the above processing techniques are applicable can be suitable. Specific examples of the materials to be preferably used include metallic materials (iron, aluminum, stainless steel, titanium, various kinds of metals, etc.), resin materials (acryl resin, PDMS (polydimethylsiloxane), etc.), glass (silicon, Pyrex (trademark), quartz glass, etc.), parylene (paraxylene vapor deposition) processed quartz glass and Pyrex glass (trademark), and fluorine-based or hydrocarbon-based silane coupling processed above glasses.

Further, it is preferable for the main body 12 to be fabricated using a transparent material so that the state of the flow contraction performed by two kinds of reaction liquids L1 and L2 can be visually observed by a microscope as will be described below in the diffusion reaction method.

It is preferable to dispose heating device (not shown) for heating the main body 12. The heating device can be realized by integrating a heater construction such as a metal resistance wire or Polysilicon into the main body. When the heater construction such as the metal resistance wire or Polysilicon is used, the temperature is controlled by using it in heating, and by urging a thermal cycling with natural cooling in cooling. Regarding a sensing of the temperature in this case, a generally adopted method in the heater construction of the metal resistance wire is integrating another same resistance wire also into the main body, and detecting the temperature based on a change in the ohmic value. A generally adopted method in the heater construction of Polysilicon is detecting the temperature using a thermoelectric couple. Also in late years, precise temperature control of blood can be realized by integrating a temperature control function using Peltier element into the main body 12. In any event, the temperature control itself can be realized in accordance with either the conventional temperature control technique or novel temperature control techniques represented by Peltier element. An optimum method can be employed by selecting a heating and cooling mechanisms and the temperature sensing mechanism corresponding on materials for the main body and by combining a configuration of an external control system.

Figure 3:
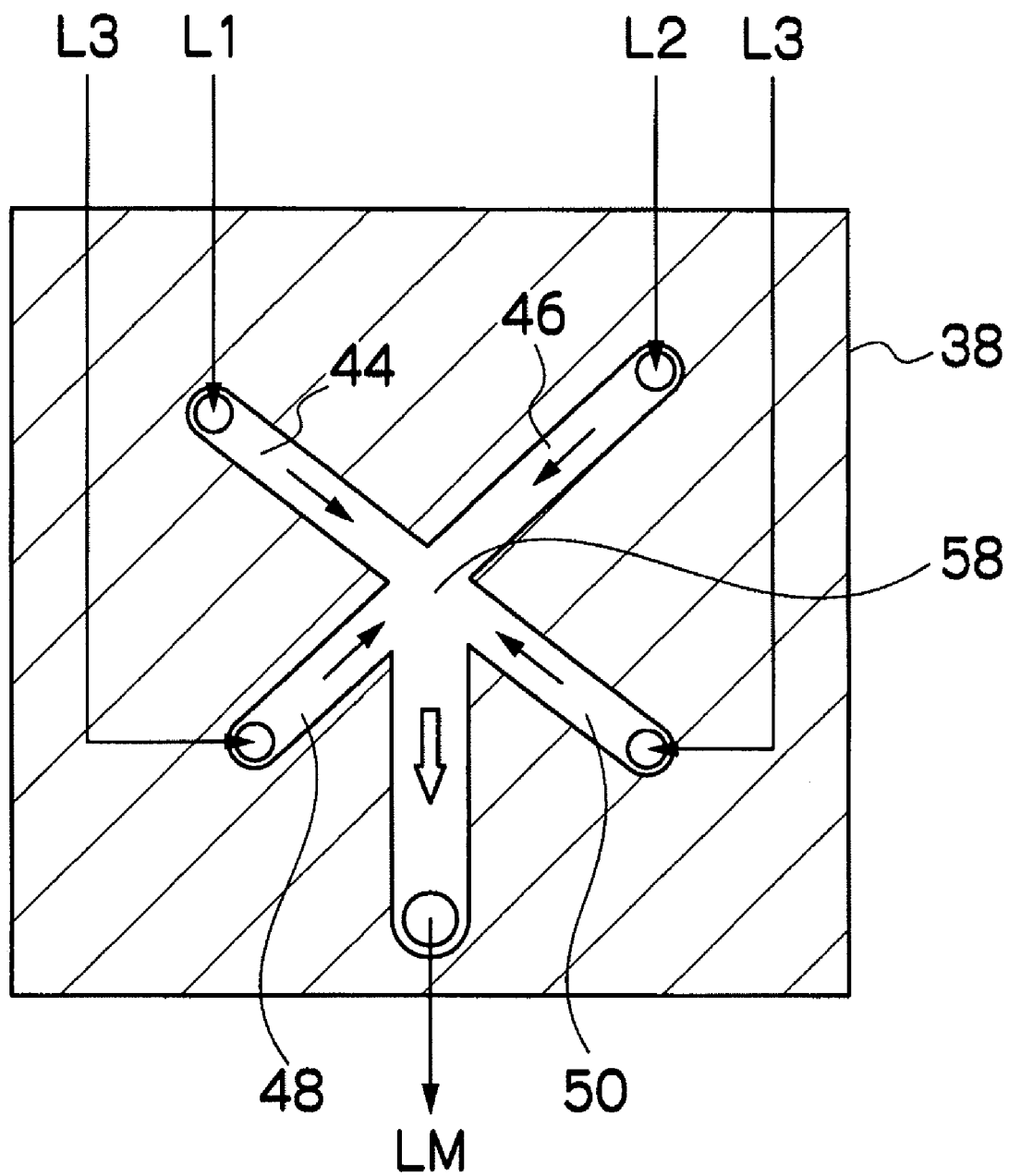
FIG. 3 is a conceptional plan view illustrating a radial type diffusion reaction device according to an embodiment of the present invention.

In FIG. 2, angle θ1 between a pair of the second introduction channels 48 and 50 through which the non-reaction liquid L3 flows is illustrated to be smaller than 180 degrees. However, it is also preferable that angle θ1 is larger than 180 degrees. FIG. 3 illustrates that angle θ1 between the pair of the second introduction channels 48 and 50 is larger than 180 degrees, and also illustrates that the first introduction channels 44, 46 and the second introduction channels 48, 50 are disposed in radial making the inlet portion (joining portion) 58 of the reaction channel 42 as a central position. In other words, at an opposite side of the reaction channel 42, the first introduction channels 44 and 46 are disposed in a V-shaped manner, and on the same side as the reaction channel 42, the second introduction channels 48 and 50 are disposed in a reverse V-shaped manner. That is, in the case of a radial type diffusion reaction device illustrated in FIG. 3, two non-reaction liquids L3 flow from oblique down position of the multilayer flows L1 and L2 toward the inlet portion (joining portion) 58 of the reaction channel 42 and join together in a manner that push up the multilayer flows L1 and L2. Pushing up the multilayer flows L1 and L2 by the two non-reaction liquids L3 promotes the flow contraction of the multilayer flows L1 and L2, as compared with the diffusion reaction device shown in FIG. 2. Additionally, in the case of FIG. 3, although the non-reaction liquid L3 is discarded with the reaction liquids L1 and L2, after flowing through the reaction channel 42, a recovery channel can be formed in the similar manner as shown in FIG. 2.

Next, a description will be made about the diffusion reaction method according to an embodiment of the present invention concerning the diffusion reaction device 10 having the above configuration. In this embodiment, a method for producing organic pigment fine particles using the device shown in FIG. 2 is explained as an example, in which an organic pigment solution prepared by dissolving organic pigments into a good solvent is employed as the reaction liquid L1, and a poor solvent with respect to the organic pigment fine particles having compatibility with the good solvent is employed as the reaction liquid L2. Further, silicone oil, for example, can be employable as the non-reaction liquid L3 which is one example of the sandwiching liquid.

FIGS. 4A to 4E are explanatory views illustrating a flow of production of organic pigment fine particles, and FIGS. 5A to 5E are explanatory views illustrating a conventional flow of production of organic pigment fine particles in which a microreactor is used in the fine particle formation process and a tank is used in the aggregates formation process.

First, using the diffusion reaction device 10 according to the embodiment of the present invention, both the organic pigment fine particle formation process and a process for forming aggregates B by aggregating the resultant organic pigment fine particles A are simultaneously carried out at a time. That is, two kinds of reaction liquids L1 and L2 are introduced from reaction liquid supply devices 22 and 24, respectively, through two reaction liquid injection tubes 14 and 16 and a pair of the first introduction channels 44 and 46 toward the inlet portion 58 of the reaction channel 42, so as to form the multilayer flow L1+L2. In this case, a flocculant (e.g., hydrochloric acid) C for aggregating the organic pigment fine particles formed is contained into the reaction liquid L2 being a poor solvent. Further, it is preferable that a dispersing agent D such as, for example, low molecular or polymer dispersing agent is added into the reaction liquid L1 being organic pigments solution.

Figure 4A:
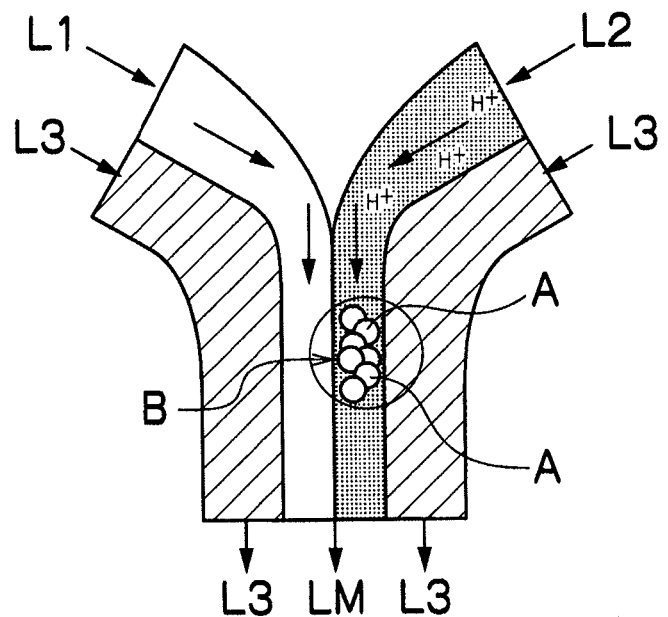
FIGS. 4A to 4E are explanatory views illustrating a flow of production of organic pigment fine particles, to which a diffusion reaction method according to an embodiment of the present invention is applied.

Further, the non-reaction liquids L3 are introduced from non-reaction liquid supply devices 26 and 28 through two non-reaction liquid injection tubes 18 and 20 and a pair of the second introduction channels 48 and 50, respectively, toward the inlet portion 58 of the reaction channel 42 (see FIG. 1 and FIG. 2). Accordingly, because a pair of non-reaction liquids L3 sandwich the multilayer flow L1+L2 at the inlet portion 58 of the reaction channel 42 as shown in FIG. 4A, the multilayer flow L1+L2 is contracted to form a flow having a taper shape. As a result, the formed multilayer flow L1+L2 is thinned to be a thin laminar flow. This thinning enables instantaneous diffusive mixing of the organic pigments solution (L1) and the poor solvent (L2) composing the multilayer flow L1+L2 and reduces the solubility of the organic pigment solution. As a result, the organic pigment solution becomes oversaturated. Accordingly, organic pigment fine particles A precipitates from the organic pigment solution. The precipitation reaction by this instantaneous mixing enables to form the organic pigment fine particles A having favorable monodisperse property in nanometer (nm) size. Generally, the surface of the precipitated organic pigment fine particles A is electrically charged in minus. When the reaction liquid L2 containing the flocculant C, for example, having proton $H^+$ such as HCl is prepared beforehand, the pigment fine particles A formed in the reaction channel 42 can aggregate promptly and change into aggregates B.

The degree of thinning of the multilayer flow L1+L2 at the inlet portion 58 of the reaction channel 42 can be varied by adjusting flow rate regulators 34 and 36 disposed at the non-reaction liquid injection tubes 18 and 20 so as to change a flow rate of the non-reaction liquid L3 to be introduced into the inlet portion 58 of the reaction channel 42. In this case, the range of total flow rate of the non-reaction liquid L3, the reaction liquids L1 and L2 at the inlet portion (joining portion) 58 differs depending on the diameter of the reaction channel 42 in use. However, it is preferable that the lower limit of the total flow rate is 20 ml/minute and the upper limit is 20,000 ml/minute. There is no specific limitation by the Reynolds number (Re) which is an indicator of a flow condition. Any flow such as a laminar flow, a transient region, and a turbulent flow is usable. However, when a reactor in which a diameter of the reaction channel 42 is 1 mm or more is used, a flow rate at which Reynolds number (Re) is 2,000 or more, which is in a transient region, is preferable. In addition, in order to realize the thinning of the multilayer flow, the non-reaction liquid flows so that a ratio of flow rate between the reaction liquids L1 and L2 and the non-reaction liquid L3 can be 1.5 times or more relative to the flow rate of the reaction liquids L1 and L2 when assuming the flow rate of the reaction liquids L1 and L2 as 1, preferably can be 2 times or more.

Flow rate regulators 30 and 32 provided to the reaction liquid injection tubes 14 and 16 are not always necessary, but it is preferable to dispose them in order to adapt to appropriate flow rates for various kinds of the reaction liquid.

Figure 5A:
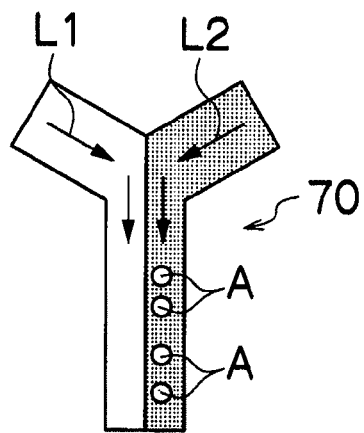
FIGS. 5A to 5E are explanatory views illustrating a conventional flow of production of organic pigment fine particles.
Figure 5B:
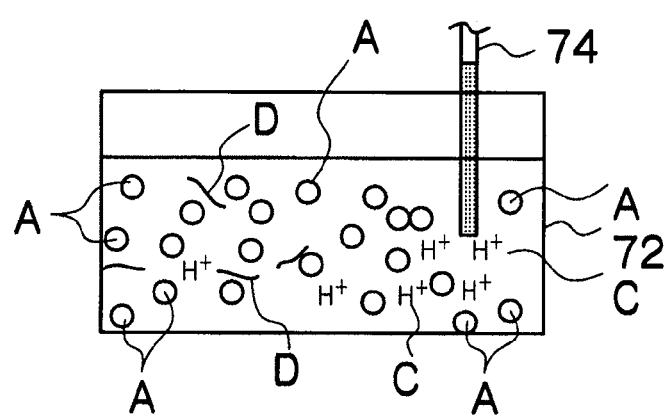
Figure 5C:
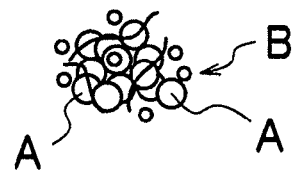
Figure 5D:
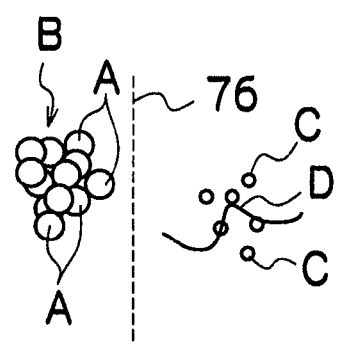
Figure 5E:
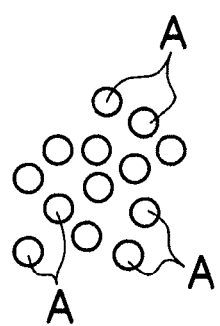

On the other hand, in the conventional case shown in FIGS. 5A to 5E, because it employs a system which thins the multilayer flow L1+L2 by narrowing the reaction channel 42 for react the reaction liquids L1 and L2 itself, it is necessary to resolve clogging of the reaction channel 42 due to the aggregates B. Accordingly, as shown in FIGS. 5A and 5B, it is necessary to separately proceed two processes of the fine particle formation process using a microreactor 70 and the aggregates formation process for forming the aggregates B by adding a flocculant through an addition pipe 74 into a tank 72 storing a disperse liquid in which the pigment fine particles A are dispersed.

Figure 4B:
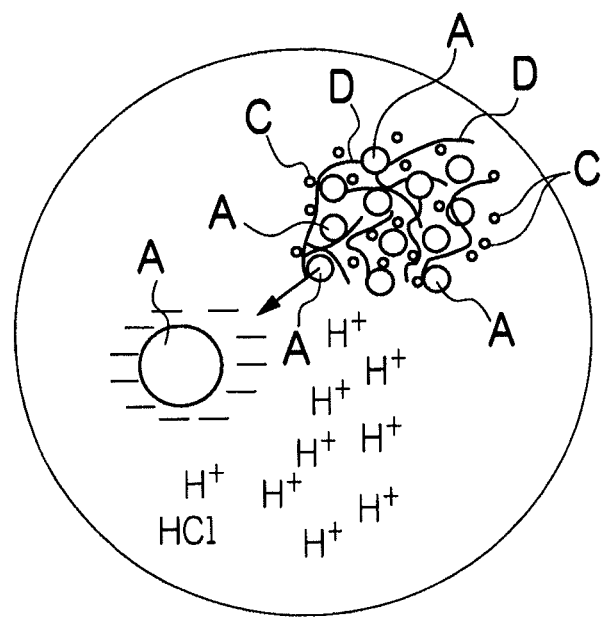
Figure 4C:
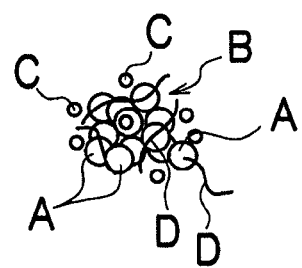
Figure 4D:
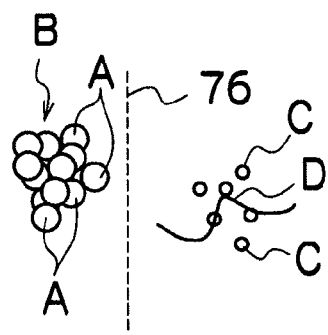
Figure 4E:
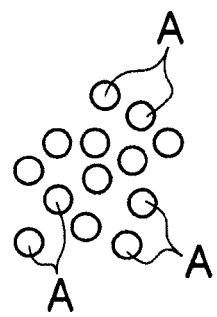

Subsequently, returning to FIGS. 4A to 4E, the disperse liquid containing the aggregates B is discarded from an outlet channel 52 of the reaction channel 42, and stored in, for example, a retention container which is not shown. Because unnecessary matters such as a surplus dispersing agent D or a flocculant C coexist among the aggregates B as shown in FIG. 4B, the unnecessary matters are removed from the aggregates B by filtering the disperse liquid by a filter 76 as shown in FIG. 4C. Although the filtration through a filter is employed in this case, any filtration method capable of removing the unnecessary matters can be employable without limiting to the filtration through the filter.

Then, a re-dispersing agent (for example, pH modifier) is added into the disperse liquid containing the aggregates B after unnecessary matters were removed, and the aggregates B are re-dispersed. Accordingly, the organic pigment fine particles of nanometer (nm) size without any unnecessary matters and having a monodisperse property can be produced.

On the other hand, in the conventional case shown in FIGS. 5A to 5E, because uniformity in the concentration distribution of the flocculant C easily occurs in the tank 72 in the formation of aggregates, homogenuous coagulation hardly occurs. Accordingly, because the sizes of the aggregates B easily become unequal, there is a fear that filtration accuracy becomes wrong in the filter filtration shown in FIG. 5D. In addition, it is difficult to achieve high precision re-dispersion in the re-dispersion shown in FIG. 5E.

Application of the diffusion reaction method according to the embodiment of the present invention to formation of the pigment fine particles enables to achieve the following effects.

(a) In the embodiment of the present invention, since the multilayer flow is contracted and thinned by sandwiching the multilayer flow L1+L2 using the sandwiching liquid, the reaction liquids can be instantaneously diffusive-mixed and react. Accordingly, the organic pigment fine particles of nanometer size with a favorable monodisperse property can be formed.

When d represents a diffusion coefficient, and L represents a typical distance over which molecules diffuse and arrive during a time period T, a relational equation $T=L^2/d$ establishes and the diffusion time is proportional to square of the distance. For example, regarding ethanol molecule, when water is employed as the solvent, the diffusion coefficient d is $0.84 \times 10^{-3}$ mm$^2$/sec (at 25° C.). It takes 20 minutes to move 1 mm and one second to move 30 μm. This is too slow to enable instantaneous diffusion reaction. However, when the multilayer flow is thinned to be 10 μm, ethanol molecules can move in 0.1 seconds. When the multilayer flow is thinned to be 1 μm, the ethanol molecules can move in 0.001 seconds, and when the multilayer flow is thinned to be 0.1 μm, the ethanol molecules can move in 10 microseconds.

Thus, for executing instantaneous diffusion reaction, thinning the multilayer flow to form a thin laminar flow is extremely important. However, in the conventional device, since the thinning is performed by narrowing the reaction channel width, although the organic pigment fine particles could be formed in the reaction channel, aggregates could not be formed because of the problems of clogging, etc.

However, in the diffusion reaction device according to the embodiment of the present invention, by sandwiching the multilayer flow with the sandwiching liquid other than the reaction liquids from both sides in depthwise direction of the layer, the multilayer flow is contracted and thinned to form a thin laminar flow without increasing pressure loss in the reaction channel. That is, according to the embodiment of the present invention, the flow contraction field is not formed by narrowing the diameter of the reaction channel itself but is formed by sandwiching the multilayer flow by the sandwiching liquid. In other words, the flow contraction field is formed by constituting an orifice with liquids. Accordingly, an instant mixing of the multilayer flow becomes possible without narrowing the channel diameter into 50 μm or smaller like the reaction channel of the conventional microreactor.

By the way, narrowing the width of the reaction channel to the width of the reaction channel enabling instant mixing in microsecond order like the conventional device is not practical. It is because it is difficult to achieve processing accuracy for forming such a reaction channel and, for example, even if such a processing accuracy is achieved, a pressure loss in the reaction channel becomes too great to use.

In addition, because the multilayer flow is sandwiched from both sides in depthwise direction of the multilayer flow, the sandwiching liquid flows along the wall of the reaction channel in the depthwise direction of the multilayer flow. Thus, adhesion of the organic pigment fine particles and the aggregates onto the wall of the reaction channel wall can be more effectively prevented. There is no flow of the sandwiching liquid in a wall of the reaction channel perpendicular to the depthwise direction of the multilayer flow. However, no adhesion of the fine particles occurs since a contact area to the wall is extremely small because of the thinning of the multilayer flow.

Moreover, the flow rate of the liquid flowing through the reaction channel is fast at the central portion, and slow at the vicinity of the wall of the reaction channel. Flowing of the non-reaction liquid along the wall of the reaction channel like the embodiment of the present invention enables to not only equalize the flow velocity of the multilayer flow in its depthwise direction but also obstruct the fine particles and the aggregates from adhering onto the wall of the reaction channel.

Accordingly, even though the whole processes from the fine particle formation process to the aggregate formation process are executed at a time in the reaction channel, the reaction channel never clogs with the formed aggregates, and the formed aggregates scarcely adhere onto the wall of the reaction channel as to instabilize the flow of the multilayer flow. Further, the embodiment of the present invention enables to simplify the processes by reducing one process as compared with the conventional processes in which the aggregates are formed in the tank after formation of the organic pigment fine particles in a microreactor.

(b) Further, performing processes from the fine particle formation process to the aggregate formation process at a time in the reaction channel enables to surely maintain a homogeneous flocculent concentration in the reaction channel, which is different from the conventional aggregate formation in the tank. Accordingly, comparing with the conventional aggregate formation in the tank, aggregates having uniform sizes can be formed. Therefore, filter filtration and re-dispersion in the post-process can be executed in high accuracy and the organic pigment fine particles having favorable monodisperse property, with nanometer (nm) sizes and without impurity can be produced.

(c) In addition, because the width of the reaction channel can be enlarged up to the limit which enables formation of a laminar flow in the reaction channel according to the embodiment, production efficiency of the organic pigment fine particles having favorable monodisperse property and with preferable nanometer sizes can be improved greatly.

(d) Further, because sandwiching the multilayer flow with liquids forms a flow contraction field according to the embodiment, suitable flow contraction fields can be formed depending on various kinds of reaction liquids. In other words, increasing the flow rate of the sandwiching liquid introduced into the reaction channel accelerates the flow velocity of the sandwiching liquid at the inlet of the reaction channel. Accordingly, the pressure sandwiching the multilayer flow becomes large and a degree of flow contraction of the multilayer flow becomes great. On the contrary, decreasing the flow rate of the sandwiching liquid reduces the flow velocity of the sandwiching liquid at the inlet portion of the reaction channel. Accordingly, the pressure sandwiching the multilayer flow becomes small and the degree of flow contraction of the multilayer flow becomes small.

Additionally, in the diffusion reaction method explained in this embodiment, although the description was made about the example for preparing the organic pigment fine particles, the method and diffusion reaction device of the present invention can be applied to various kinds of reaction. Examples of the other materials for forming the fine particles include titanium dioxide, calcium carbonate, copper oxide, aluminum oxide, iron oxide, chromium oxide, bismuth vanadium oxide, rutile type blending phase pigments, silver halide, silica and carbon black; however, the materials should not be limited to these examples.

Additionally, although the organic pigments used in the preferred embodiment are not specifically described, any organic pigments can be used. Further, following dispersing agents can be used in the embodiment of the present invention.

Examples of the anionic dispersing agent (anionic surfactant) include N-acyl-N-alkyltaurine salts, fatty acid salts, alkyl sulfate ester salts, alkylbenzenesulfonates, alkylnaphthalenesulfonates, dialkylsulfosuccinates, alkylphosphate ester salts, naphthalenesulfonic acid-formalin condensates, polyoxyethylene alkylsulfic ester salts and so on. Among those, N-acyl-N-alkyltaurine salts are preferable. Those disclosed in Japanese Patent Application Laid-Open No. 3-273067 are preferable as N-acyl-N-alkyl taurine salts. Only a single anionic dispersing agent can be used, or two or more anionic dispersing agents can be used in combination.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid and salt of these cationic substances. Only a single a cationic dispersing agent can be used, or two or more cationic dispersing agents can be used in combination.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkylethers, polyoxyethylenealkylaryl ethers, polyoxyethylene fatty acid esters, sorbitan fatty acid esters, polyoxyethylenesorbitan fatty acid esters, polyoxyethylenealkylamines, glycerine fatty acid esters and so on. Among these, polyoxyethylenealkylaryl ethers are preferable. Only a single nonionic dispersing agent can be used, or two or more nonionic dispersing agents can be used in combination.

The organic pigmentary dispersing agent is defined as a dispersing agent derived from an organic pigment as a parent material, and prepared by chemically modifying a structure of the parent material. Examples include sugar-containing organic pigmentary dispersing agents, piperidyl-containing organic pigmentary dispersing agents, naphthalene- or perylene-derivative organic pigmentary dispersing agents, organic pigmentary dispersing agents having a functional group linked through a methylene group to a parent-structure, organic pigmentary dispersing agents (parent-structure) chemically modified with a polymer, organic pigmentary dispersing agents having a sulfonic acid group, organic pigmentary dispersing agents having a sulfonamide group, organic pigmentary dispersing agents having an ether group, and organic pigmentary dispersing agents having a carboxylic acid group, carboxylic acid group or a carboxamide group.

Specific examples of the polymer dispersing agent include polyvinylpyrrolidone, polyvinyl alcohol, polyvinyl methylether, polyoxyethylene, polyethylene glycol, polypropylene glycol, polyacrylamide, vinyl alcohol-vinyl acetate copolymer, polyvinyl alcohol-partly formalated product, polyvinyl alcohol-partly butyralated product, vinylpyrrolidone-vinyl acetate copolymer, polyoxyethylene/propylene oxide block copolymer, polyacrylate, polyvinyl sulfate, poly(4-vinylpyridine) salt, polyamide, polyallylamine salt, condensed naphthalenesulfonate, styrene-acrylate copolymer product, styrene-methacrylate copolymer product, acrylate-acrylate copolymer product, acrylate-methacrylate copolymer product, methacrylate-acrylate copolymer product, methacrylate-methacrylate copolymer product, styrene-itaconic acid salt copolymer product, itaconic acid ester-itaconic acid salt copolymer product, vinylnaphthalene-acrylate copolymer product, vinylnaphthalene-methacrylate copolymer product, vinylnaphthalene-itaconic acid salt copolymer product, cellulosic, carbohydrate derivative and so on. Besides, natural polymers such as alginate, gelatin, albumen, casein, Arabian rubber, Tongant rubber, lignosulfonate can be also usable. Among those, polyvinylpyrrolidone is preferable. Only a single a polymer can be used, or two or more polymers can be used in combination. Further, examples of the polymer dispersing agent include a mode prepared by mixing an anionic dispersing agent into an aqueous medium and mixing a nonionic dispersing agent and/or a polymer dispersing agent into a solution in which organic pigments are dissolved.

In order to further improve a homogeneous dispersibility and a preservation stability of the organic pigment, the blending amount of the dispersing agent is preferably within the range from 0.1 to 1,000 parts by mass, more preferably within the range of from 1 to 500 parts by mass, further preferably within the range from 10 to 250 parts by mass with respect to 100 parts by mass of the organic pigments. When the blending amount of the dispersing agent is less than 0.1 parts by mass, the dispersion stability of the organic pigment fine particles can not be improved.

EXAMPLES

Example 1-1

Next, the present invention will be explained in detail by Example 1, but it should be noted that the present invention is not limited to these examples.

In Example 1-1, the formation process of organic pigment fine particles was performed using the diffusion reaction device according to the embodiment of the present invention. An organic pigment solution was used as a reaction liquid L1, and a poor solvent was used as a reaction liquid L2. Further, a solvent without addition of any flocculant was employed as the poor solvent.

(1) Organic Pigment Solution
　Readily-soluble magenta based organic pigment PR122 (2,9-dimethylquiqnadrine) . . . 50 g
　Dispersing agent polyvinylpyrrolidone . . . 100 g
　Dimethylsulfoxide . . . 1,000 mL
　Sodium methoxide 28% methanol solution . . . 33.3 mL The above-mentioned components were mixed by stirring sufficiently at a room temperature, and completely dissolved. Then, the resultant solution was filtered through a microfilter of 0.45 μm and impurities such as litters were removed.

(2) Distilled water was used as the poor solvent.
(3) Silicone oil was used as a non-reaction liquid L3.
(4) A radial type diffusion reaction device illustrated in FIG. 3 which is equipped with a rectangular reaction channel of 0.5 mm in size in length and width was used as a device. In addition, by using a cover plate of the main body formed with transparent resin, contraction condition at the inlet portion 58 of the reaction channel 42 and an adhesion condition of the organic pigment fine particles onto the reaction channel wall became observable by a microscope.
(5) Reaction Condition
　(i) Set flow rate . . . Using a micro syringe pump (made by Harvard Company), the organic pigment solution was supplied at a constant flow rate of 20 mL/minute, and the poor solvent was supplied at a constant flow rate of 80 mL/minute. In addition, two non-reaction liquids were fed at a constant flow rate of 75 mL/minute (totally 150 mL/minute) respectively.
　(ii) Reaction temperature . . . Test was conducted at 18° C., for 20 hours in succession.

The particle size and degree of monodispersion (Mv/Mn) of the prepared organic pigment disperse liquid were measured by Nanotrac UPA-EX150 made by Nikkiso Co., Ltd., and then, a median mean diameter and an arithmetic standard deviation were calculated.

As a result, microscope observation showed that the multilayer flow of the organic pigment solution and the poor solvent is contracted and thinned to form a thin laminar flow by the non-reaction liquids at the inlet portion of the reaction channel. In addition, any adherence of the fine particles onto the wall of the reaction channel was not observed.

As a result, a disperse liquid of the organic pigment containing the organic pigment fine particles with the concentration of 1% by mass was obtained as a reaction produced liquid LM. The particle diameter of the organic pigment fine particles was 20.6 nm, and degree of monodispersion (Mv/Mn) was 1.33.

In Example 1-1, Reynolds number Re in the reaction channel 42 was 1,700 or less indicating that the flow in the passage was a laminar flow, and the pressure loss in the reaction channel 42 was as low pressure loss as 0.2 MPa.

Example 1-2

Further, in Example 1-2, the radial type diffusion reaction device shown in FIG. 3 was used, and a poor solvent (distilled water) being one of the reaction liquids L1 and L2 was employed as sandwiching liquid. That is, the organic pigment solution and distilled water were introduced through the first introduction channels 44 and 46 respectively to form the multilayer flow, and only distilled water was introduced from the second introduction channels 48 and 50. Accordingly, the organic pigment solution was sandwiched with distilled water at the inlet portion (joining portion) 58 of the reaction channel 42. The organic pigment solution and distilled water were introduced through the first introduction channels 44 and 46 respectively at a flow rate of 20 mL/minute (totally 40 mL/minute), and the distilled water was introduced from the second introduction channels 48 and 50 respectively at a flow rate of 40 mL/minute (totally 80 mL/minute). Other conditions such as the device or so are fundamentally the same as Example 1-1.

As a result, similarly to the result of Example 1-1, the organic pigment fine particles with the favorable monodisperse property it was possible to obtain.

Example 2

In Example 2, a mixing degree with respect to a diffusion time T was examined using the radial type diffusion reaction device shown in FIG. 3.

In the examination, DMSO (dimethyl sulhoxide) solvent (without containing organic pigments) was used as the reaction liquid L1, and distilled water was used as the reaction liquid L2. Further, silicone oil was used as the non-reaction liquid L3.

Then, the mixing degree with respect to the diffusion time were examined when distilled water, DMSO and two non-reaction liquids were fed into the inlet portion of the reaction channel having the equivalent-diameter of 0.5 mm at the flow rate of 7.65 mL/minute, 5.00 mL/minute and 50 mL/minute, respectively. Physical property values of DMSO were 0.002 Pa·s in viscosity and 1,100 kg/m$^3$ in density.

Figure 6:
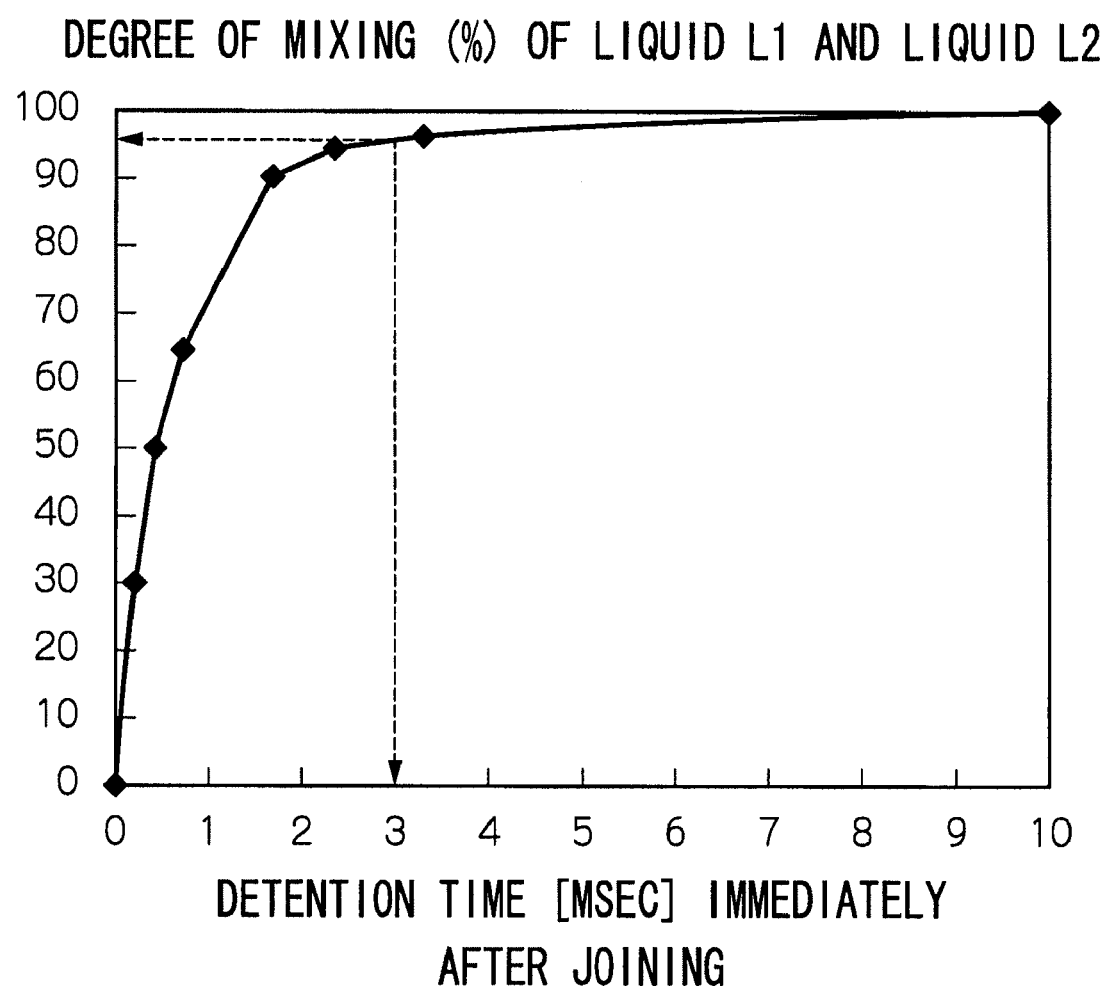
FIG. 6 is an explanatory view illustrating a relation between time period of diffusive mixing and a mixing degree in Examples.

As a result, it was observed that the multilayer flow in which DMSO solvent and distilled water were layered was formed and that the multilayer flow was contracted to have a taper shape by the non-reaction liquids at the inlet portion 58 of the reaction channel 42. Resultantly, as shown in FIG. 6, the mixing degree exceeded 90% at about 3 msec after the DMSO solvent and the distilled water joined together at the inlet portion of the reaction channel. Thus, it could be verified that instantaneous mixing could be achieved by contracting and thinning the multilayer flow to form a thin laminar flow by sandwiching the multilayer flow by the sandwiching liquid.

What is claimed is:

1. A diffusion reaction method comprising:
    joining a plurality of reaction liquids relating to a reaction to form a multilayer flow;
    sandwiching from both sides of the multilayer flow in the depthwise direction using sandwiching liquid so that the multilayer flow is contracted and thinned; and
    flowing the multilayer flow through a reaction channel to cause a diffusive mixing between laminar flows so as to cause the reaction, wherein:
    the plurality of reaction liquids are a solution prepared by dissolving fine particle forming materials into a good solvent and a poor solvent with respect to the fine particle forming materials, and
    the diffusion reaction method further comprises:
        precipitating fine particles by causing diffusive mixing of the two reaction liquids in the reaction channel and by making them to react each other, and
        aggregating the precipitated fine particles in the reaction channel by inclusion of a flocculent into the poor solvent.

2. The diffusion reaction method according to claim 1, wherein
    the multilayer flow is thinned to be 50 μm or less.

3. The diffusion reaction method according to claim 1, further comprising
    varying a degree of the thinning of the multilayer flow by changing a flow rate of the sandwiching liquid which sandwiches the multilayer flow.

4. The diffusion reaction method according to claim 1, wherein the fine particles formed by the diffusion reaction are organic pigment fine particles.

5. The diffusion reaction method according to claim 3, wherein the fine particles formed by the diffusion reaction are organic pigment fine particles.

* * * * *